United States Patent [19]

Ohshima et al.

[11] Patent Number: 4,718,051
[45] Date of Patent: Jan. 5, 1988

[54] OPTICAL BEAM TRACKING SYSTEM FOR USE IN OPTICAL INFORMATION RECORDING AND/OR REPRODUCING APPARATUS

[75] Inventors: Ken Ohshima, Hachioji; Jun Sakashita, Nagano; Hiroo Okada, Hachioji, all of Japan

[73] Assignee: Olympus Optical Company Limited, Tokyo, Japan

[21] Appl. No.: 686,218

[22] Filed: Dec. 26, 1984

[30] Foreign Application Priority Data

Dec. 28, 1983 [JP] Japan .................. 58-251678

[51] Int. Cl.$^4$ ................................ G11B 7/00
[52] U.S. Cl. ................................ 369/44
[58] Field of Search ............ 369/32, 33, 43–47; 358/342; 250/201–204

[56] References Cited

U.S. PATENT DOCUMENTS 4,138,741 2/1979 Hedlund et al. .......... 369/47 X
4,142,209 2/1979 Hedlund et al. .......... 369/44 X
4,536,863 8/1985 Giddings .................. 369/44 X

*Primary Examiner*—Robert L. Richardson
*Attorney, Agent, or Firm*—Bruce L. Adams; Van C. Wilks

[57] ABSTRACT

A beam tracking system is used in an optical information recording and/or reproducing apparatus to optically track a record medium track. An objective lens irradiates an optical beam onto the record medium and is driven by a lens actuator to sweep the optical beam in a coarse mode relative to a predetermined track of the record medium. A carriage moves relative to the record medium for carrying the objective lens thereon and is driven by a carriage actuator to sweep the optical beam in a fine mode relative to the track. A detector detects the reflected optical beam during the sweep of the optical beam to produce a tracking signal representative of the deviation of the optical beam from the track. A pair of control circuits are connected to control the lens and carriage actuators respectively to effect the alignment of the optical beam with the track according to the tracking signal. A timing circuit is coneected to enable operation of the control circuit which controls the lens actuator and to inhibit operation of the other control circuit which controls the carriage actuator for a certain interval to effect alignment of the optical beam solely by means of the lens actuator, and thereafter to enable the other control circuit to maintain the optical beam alignment by means of the cooperative action of the lens and carriage actuators.

12 Claims, 7 Drawing Figures

OPTICAL BEAM TRACKING SYSTEM FOR USE IN OPTICAL INFORMATION RECORDING AND/OR REPRODUCING APPARATUS

BACKGROUND OF THE INVENTION

1. Field of the Invention

The present invention relates to an optical data recording and/or reproducing apparatus with a disc-shaped optical memory medium. More specifically, the present invention relates to a two-stage tracking servo system whereby a light beam tracks the desired information track on the optical memory disk.

2. Description of the Prior Art

An optical data recording and/or reproducing apparatus using a laser beam controlled to irradiate the optical memory disk is known as, for example, a laser memory apparatus or a magneto-optical memory apparatus.

In the optical memory apparatus of this type, information data is precisely stored onto and retrieved from the previously determined track provided on the optical memory disk by means of a laser beam tracking system.

In the optical memory apparatus, there is usually an eccentricity of several tens of microns on the track when the optical memory disk is rotating due to the disk eccentricity itself and, in another case, due to a spinning shaft of a disk drive motor.

Under the above mentioned condition, an objective lens is usually shifted from the mechanical center of the lens-carrying pickup when a simple lens tracking system is used for the apparatus. This also offsets an electric tracking signal as optical offset and the optical offset makes the beam track at the off-track position depending on the signal offset level.

To avoid the off-track condition, there have been proposed several systems, among which one example is the eccentricity compensation system in which pickup motion is controlled to compensate for the eccentricity by means of a special correction apparatus whereby the eccentricity is previously measured and stored. Another example is the two-stage tracking servo system in which both objective lens and the carriage wherein the lens is installed are controlled to track the desired track on the optical memory disk in two-stage way depending on the tracking signal.

In the former system, there is required some special correction apparatus for compensating for the eccentricity.

In the latter system, inappropriate timing control for lens tracking and carriage tracking makes it difficult to move the beam from off-track condition to an on-track condition swiftly because the objective lens and the carriage, at the same time undergo, lens tracking respectively and carriage tracking, in the two-stage way.

In other words, not only the objective lens cannot track the nearest track of the beam irradiating position the moment the tracking system tracks in the on-track condition, but also under various conditions the tracking system sometimes cannot operate in locked servo control.

As mentioned above, tracking systems in prior art have serious drawbacks when starting their tracking for data recording or retrieving in the optical disk memory apparatus.

SUMMARY OF THE INVENTION

It is an object of the present invention to provide an improved two-stage tracking system for the optical memory apparatus whereby the objective lens and the carriage can track the desired track on demand of a tracking signal and can shift the tracking condition very swiftly from an off-track condition to an on-track condition.

In accordance with the present invention, there is provided a beam tracking system for use in an optical data recording and/or reproducing apparatus with a memory medium of the type which comprises: detecting means for producing a tracking signal whereby the beam irradiating position relative to the track on the memory medium is indicated, tracking means whereby the beam position is moved to be corrected by means of the tracking signal, carrying means wherein at least a part of the tracking means is carried thereon, and beam is moved in the radial direction of the memory medium, control means whereby the carrying means is controlled, the tracking means and the carrying means are controlled by means of the tracking signal, and tracking is performed by means of the tracking means and/or said carrying means, characterized in that tracking timing for the tracking means and tracking timing for the carrying means differ from each other.

A beam tracking system according to the present invention, in another aspect thereof, is characterized in that tracking for the carrying means is started after a predetermined time of tracking for the tracking means.

A beam tracking system according to the present invention is further characterized in that tracking for the tracking means and tracking for the carrying means are started at the same time, and low frequency gain for the carrying means is lowered for a predetermined time from the starting time whereby the carrying means actually operates in delayed operation.

In a further aspect of the present invention, a beam tracking system is characterized in that tracking for the tracking means and tracking for the carrying means are started at the same time, and low frequency gain for the carrying means is gradually changed for a predetermined time immediately after the starting time whereby the carrying means actually operates in delayed operation.

BRIEF DESCRIPTION OF THE DRAWINGS

The invention will be described in more detail with reference to the drawings, in which.

DESCRIPTION OF THE PREFERRED EMBODIMENTS

Figure 1:
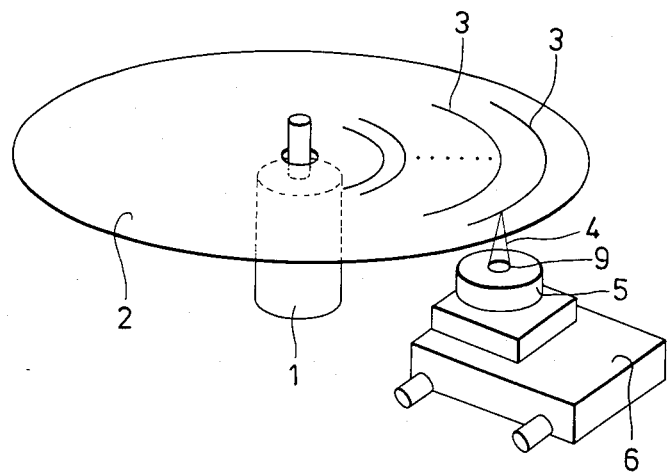
FIG. 1 is a prospective view showing a beam tracking system for use in an optical memory apparatus with disc-shaped memory medium according to the present invention.

The same reference numerals will be used in the several views to represent the same elements.

Figure 2:
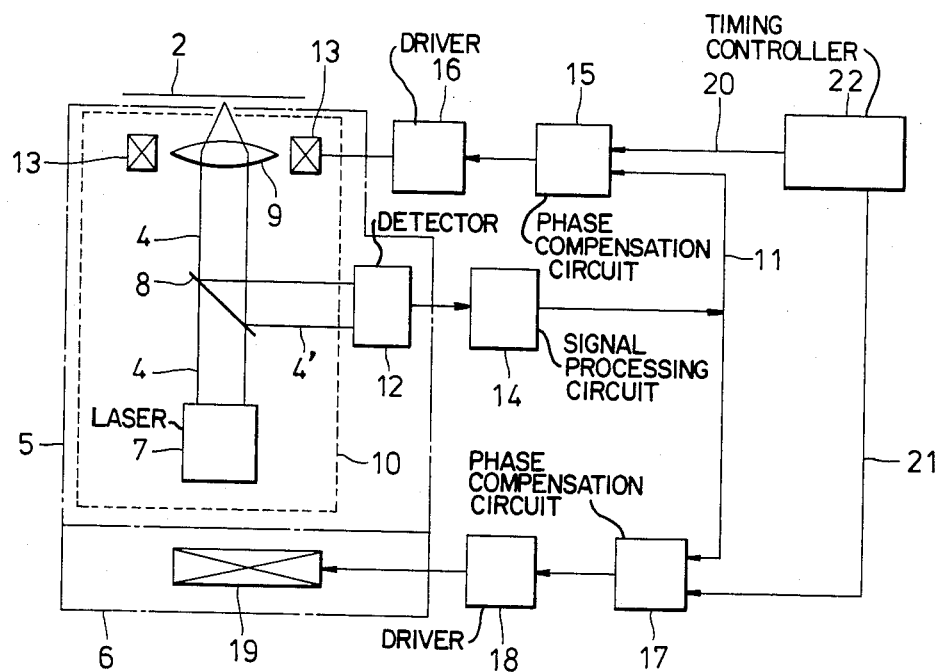
FIG. 2 is a block diagram showing a beam tracking system according to the present invention.

In the embodiment shown in FIG. 1 and FIG. 2, rotating a optical memory disk 2 on which an information track 3, for example in the form of a groove, is formed is mounted on the turntable (not shown) attached to the spindle shaft of the motor 1. Laser beam 4 produced from a pickup 5 irradiates the track 3. The beam tracks the track 3 by means of a detected light signal from the reflected light 4' and information data are stored on or retrieved from the disk 2. Pickup 5 is mounted on the carrying means, for example a carriage 6, and is moved in the radial direction of the disk by means of an actuator 19. The pickup 5 comprises a laser 7 by which the laser beam 4 is produced, a beam splitter 8, an optical system 10 including an objective lens 9, a detector 12 by which an output signal is produced, and an actuator 13 by which the objective lens 9 is moved to sweep the optical beam relative to the track.

The output signals from the detector 12 are summed or subtracted by means of a signal processing circuit 14 which produces a tracking signal 11 representative of the deviation of the beam from the track. The tracking signal 11 is applied to a phase compensation circuit 15 together with a lens tracking command signal 20 which is produced from a timing controller or command means 22 for driving the objective lens 9. The output signal from the phase compensation circuit 15 demanded or enabled by the lens tracking command signal 20 is amplified via a driver 16 and applied to the objective lens actuator 13 whereby the position of the objective lens 9 is controlled to align the beam to the track.

On the other hand, the tracking signal 11 is, at the same time, applied to another phase compensation circuit 17 together with a carriage tracking command signal 21 produced from the timing controller 22 for driving the carriage 6. The output signal from the phase compensation circuit 17 demanded or enabled by the carriage tracking command signal 21 is amplified via a driver 18 and applied to a carriage actuator 19 whereby the position of the carriage 6 follows the track under the controlled tracking to maintain the alignment of the beam.

Figure 3:
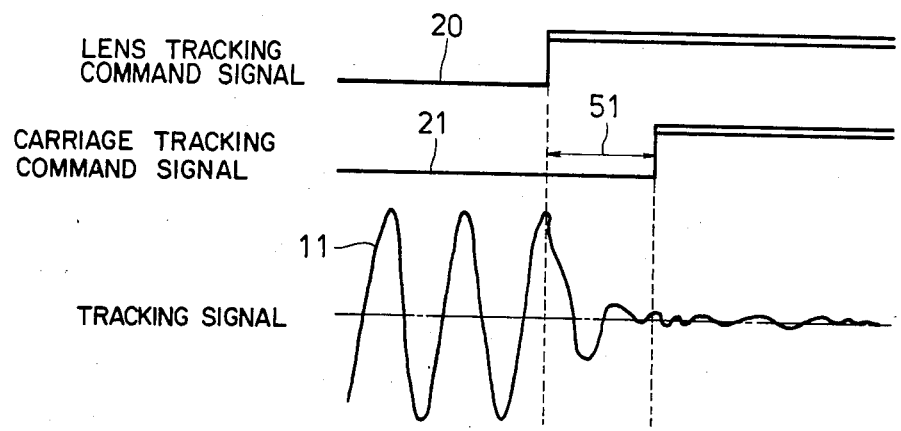
FIG. 3 shows a plurality of waveforms for explaining the operation of the present invention.

According to the invention, as shown in FIG. 3, the carriage tracking command signal 21 is delayed by a desired or predetermined time $T_1$ 51 from the lens tracking command signal 20 to temporarily inhibit the phase compensation circuit 17 during the predetermined interval 51.

Figure 4:
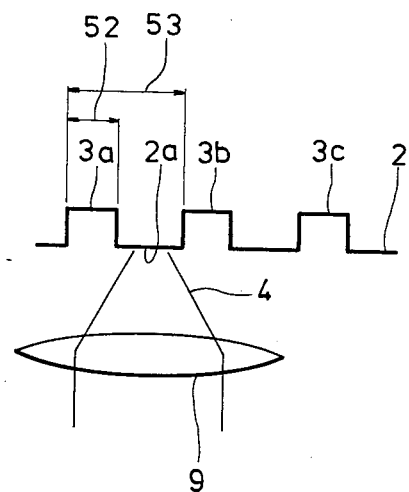
FIG. 4 is a cross-sectional view showing a principal part for explaining the operation of the present invention.

This delay time or interval $T_1$ 51 is determined by the servo system characteristics of the two-stage tracking servo system. As for the example, a preferable delay time $T_1$ is found to be more than 0.2 mS (mili-second) and less than the time required to rotate the disk 2 a quarter of one found. In other words, preferable beam tracking is performed when the objective lens 9 can track a track 3b nearest from the beam irradiating position 2a so that the tracking system operates in the on-track condition as shown in FIG. 4. In the case of the present example, it takes 1 mS at the longest to shift the beam 4 from the mid position between the track 3a and the track 3b to the center of the track 3b. Then 1 mS is preferably determined for the delay time $T_1$.

The reason why the maximum delay time $T_1$ is limited within the time required for a quarter rotation of the disk is as follows; as the carriage 6 cannot follow the track 3 during the delay time $T_1$, only the objective lens 9 can track the track 3 and further, as the gain of the phase compensation circuit 15 for the objective lens 9 is low in the low frequency band, the objective lens 9 cannot sustain the tracking in the displaced position from the mechanical center of the pickup because of an eccentricity of several tens of microns.

In FIG. 4, there is shown a track width 52 as 0.7 μm and a track pitch 53 as 1.6 μm as for example.

Also, the preferable delay time $T_1$ can be determined by a delay circuit provided in the timing controller 22 shown in FIG. 2.

Figure 5:
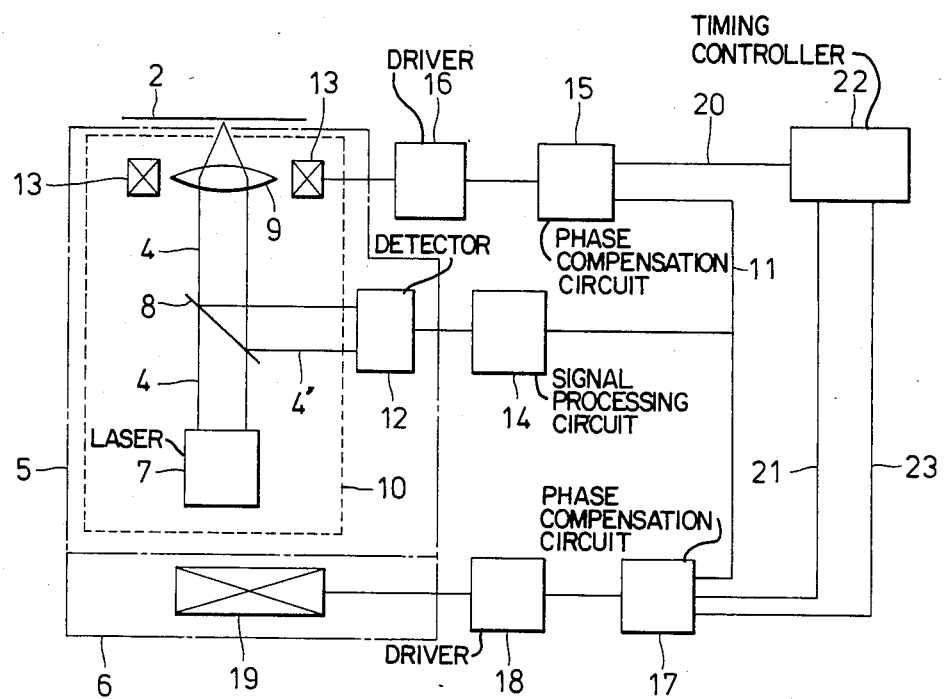
FIG. 5 is a block diagram showing a beam tracking system according to the present invention.
Figure 6:
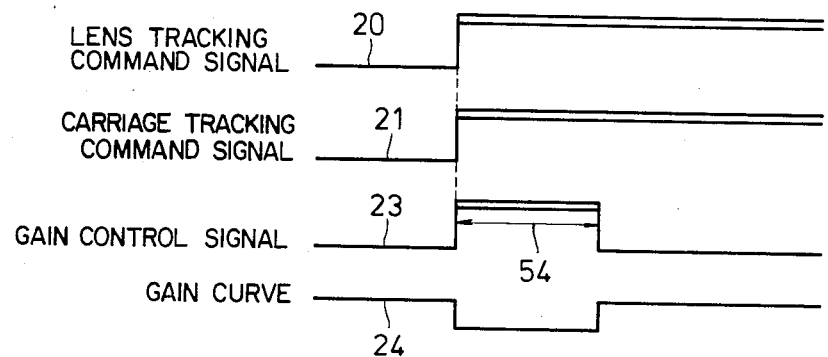
FIG. 6 shows a plurality of waveforms for explaining the operation of the present invention.

Referring to FIG. 5 and FIG. 6, another preferable embodiment of the invention is described.

In this embodiment, the lens tracking command signal 20 and carriage tracking command signal 21 are, at the same time, supplied to each of the phase compensation circuits 15, 17 from the timing controller 22 to initiate the phase compensation circuits 15, 17. At the same time, furthermore, the timing controller 22 supplies a gain control or suppression signal 23 to the phase compensation circuit 17 for a desired time or duration $T_2$ (54 in FIG. 6) whereby, at least in the low frequency band, gain of the phase compensation circuit 17 is lowered to suppress the phase compensation circuit 17.

As mentioned above, the tracking system as shown in FIG. 5 performs preferable tracking operation when the phase compensation circuit gain is lowered 40 db as for example.

Furthermore, it is possible that the carriage tracking command signal 21 can be supplied earlier than the lens tracking command signal even when the carriage tracking signal 21 and the gain control signal 23 are supplied at the same moment.

Furthermore, it is found that, when the gain is properly adjusted, there is no need to limit the delay time $T_2$ within the time required for a quarter rotation of the disk depending on its rotating speed.

The reason for above is as follows; when the gain value is properly adjusted to be low, the carriage 6 almost cannot move when the objective lens 9 starts its tracking. And when the gain value is properly adjusted to be high, the objective lens 9 cannot be displaced largely while the carriage 6 can follow the tracking operation to some extent.

Figure 7:
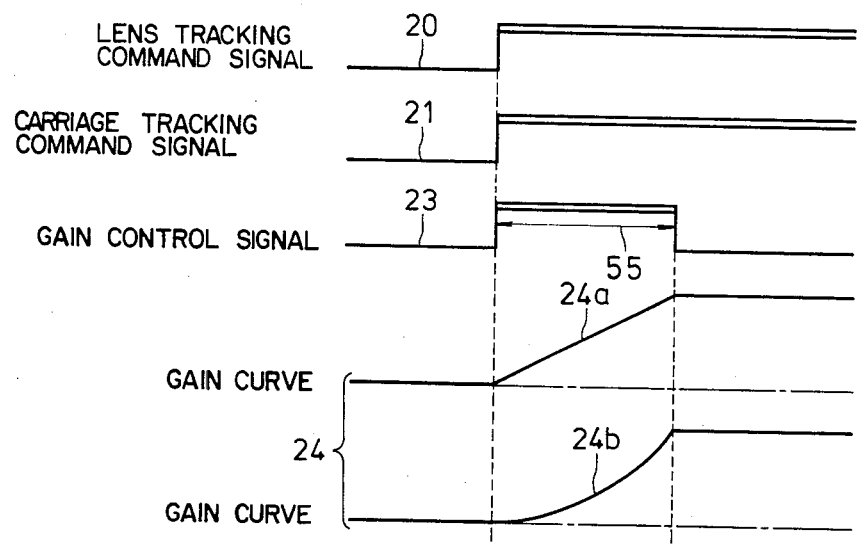
FIG. 7 shows a plurality of waveforms for explaining the operation of the present invention.

Referring to FIG. 5 and FIG. 7, further preferable embodiment of the invention is shown.

In this embodiment, at least in the low frequency band, gain of phase compensation circuit 17 is gradually changed for a desired time $T_2$ as shown by 55 and 24 in FIG. 7.

The changing of the gain can be done either in a linear as shown by 24a or in a curve or non-linear as shown by 24b in FIG. 7 when the gain should be kept enough low within 0.2 mS after the lens tracking command signal 20 is supplied.

Furthermore, the gain curve 24 and the desired time $T_3$ 55 as shown in FIG. 7 should be properly selected depending upon both the required time for the system to be an on-tracking state and frequency response of the servo system.

In the present example, the timing control circuit 22 comprises a mono-stable multivibrator. However, any of other timing signal generating means may be employed to produce the signals as shown in FIG. 6 and FIG. 7.

While the present embodiments of the invention have been described in substantial detail, it will be apparent that the invention may take many forms. Accordingly, it should be understood from the above description that various changes and modifications in the form and detail may be made therein without departing from the spirit and scope of the invention.

What is claimed is:

1. In a beam tracking system for use in an optical data recording and/or reproducing apparatus with a memory medium of the type having detecting means for producing a tracking signal representative of a beam irradiating spot relative to a track on said memory medium, tracking means for moving said beam irradiating spot to correct the same according to the said tracking signal, carrying means for carrying at least a pair of said tracking means thereon to effect the movement of the beam in the radial direction of said memory medium, and control means for controlling said carrying means so that said tracking means and said carrying means are controlled according to said tracking signal, and tracking is performed by means of said tracking means and/or said carrying means, the improvement comprising:

command means for producing a command signal effective to determine a tracking timing such that said carrying means is enabled after said tracking means is enabled.

2. A beam tracking system as defined in claim 1; wherein the command means includes means for producing a command signal effective to determine a time such that the tracking by said carrying means is started after a predetermined time from the start of tracking by said tracking means.

3. A beam tracking system as defined in claim 1; wherein the command means includes means for producing a command signal effective to determine an interval such that the tracking by said tracking means and the tracking by said carrying means are initiated at the same time, and a low frequency gain for said carrying means is lowered for a predetermined interval so that said carrying means actually operates after a delay interval.

4. A beam tracking system as defined in claim 1; wherein the command means includes means for producing a command signal effective to determine an interval such that the tracking by said tracking means and the tracking by said carrying means are initiated at the same time, and a low frequency gain for said carrying means is gradually changed for a predetermined interval immediately after the initiation thereof so that said carrying means actually operates after a delay interval.

5. A beam tracking system for use in an optical information recording and/or reproducing apparatus for optically tracking a track of a record medium, comprising: optical means movable relative to a record medium for irradiating an optical beam onto the record medium; first actuating means for actuating the optical means to sweep the optical beam relative to a predetermined track of the record medium; carrying means movable relative to the record medium for carrying the optical means thereon; second actuating means for actuating the carrying means to sweep the optical beam relative to the predetermined track of the record; detecting means for detecting the optical beam reflected from the record medium during the sweep of the optical beam to produce a tracking signal representative of the deviation of the optical beam from the predetermined track; first control means operative when enabled for controlling the first actuating means to effect alignment of the optical beam with the predetermined track according to the tracking signal; second control means operative when enabled for controlling the second actuating means to effect alignment of the optical beam with the predetermined track according to the tracking signal; and command means for producing command signals effective to enable the first control means and inhibit the second control means for a predetermined interval so that the alignment of the optical beam is effected solely by the operation of the first actuating means based on the tracking signal during the predetermined interval, and effective to enable the second control means after a lapse of the predetermined interval so that the alignment of the optical beam is maintained by the operations of the first and second actuating means based on the tracking signal.

6. A beam tracking system as defined in claim 5; including driving means for rotatably driving the record medium to continuously subject the record medium track to irradiation by the optical beam.

7. A beam tracking system as defined in claim 6; wherein the command means includes means for determining the predetermined interval less than a quarter period of one complete rotation of the record medium.

8. A beam tracking system as defined in claim 5; wherein the command means includes means for applying a first command signal to the first control means to enable the same and applying a second command signal to the second control means after the predetermined interval to enable the same.

9. A beam tracking system as defined in claim 5; wherein the command means includes means for applying a command signal to the first and second control means at the same time to initiate the same, and means for applying a suppression signal having a predetermined duration to temporarily suppress the second control means during the predetermined duration.

10. A beam tracking system as defined in claim 9; wherein the second control means includes means for reducing a low frequency gain of the second control means during the predetermined duration.

11. A beam tracking system as defined in claim 10; wherein the reducing means includes means for linearly controlling the low frequency gain.

12. A beam tracking system as defined in claim 10; wherein the reducing means includes means for nonlinearly controlling the low frequency gain.

* * * * *